(12) United States Patent
Yamamoto et al.

(10) Patent No.: US 7,489,452 B2
(45) Date of Patent: Feb. 10, 2009

(54) TELEPHOTO ZOOM LENS SYSTEM

(75) Inventors: Chikara Yamamoto, Saitama (JP); Takayuki Ito, Saitama (JP)

(73) Assignee: Hoya Corporation, Tokyo (JP)

(*) Notice: Subject to any disclaimer, the term of this patent is extended or adjusted under 35 U.S.C. 154(b) by 0 days.

(21) Appl. No.: 11/838,923

(22) Filed: Aug. 15, 2007

(65) Prior Publication Data

US 2008/0043342 A1 Feb. 21, 2008

(30) Foreign Application Priority Data

Aug. 15, 2006 (JP) .............................. 2006-221340

(51) Int. Cl.
*G02B 15/14* (2006.01)

(52) U.S. Cl. ........................ 359/687; 359/684; 359/715; 359/740; 359/774

(58) Field of Classification Search ................. 359/684, 359/687, 715, 740, 774
See application file for complete search history.

(56) References Cited

U.S. PATENT DOCUMENTS

| | | | | |
|---|---|---|---|---|
| 4,657,351 | A | * | 4/1987 | Mori ........................... 359/687 |
| 5,144,488 | A | | 9/1992 | Endo et al. |
| 5,191,476 | A | * | 3/1993 | Sato ........................... 359/687 |
| 7,113,346 | B1 | * | 9/2006 | Souma et al. ................ 359/687 |
| 7,253,972 | B2 | | 8/2007 | Fujisaki et al. |
| 2003/0156333 | A1 | | 8/2003 | Yamada |

FOREIGN PATENT DOCUMENTS

| | | |
|---|---|---|
| JP | 3 228008 | 10/1991 |
| JP | 6 51202 | 2/1994 |
| JP | 9 133865 | 5/1997 |
| JP | 2003 241097 | 8/2003 |

OTHER PUBLICATIONS

English language Abstract of JP 6-51202.
English language Abstract of JP 9-133865.

* cited by examiner

*Primary Examiner*—Evelyn A. Lester
(74) *Attorney, Agent, or Firm*—Greenblum & Bernstein P.L.C.

(57) ABSTRACT

A telephoto zoom lens system includes a positive first lens group, a negative second lens group as a focusing lens group, a diaphragm, a positive third lens group, and a positive fourth lens group, in this order from the object.

Upon zooming from the short focal length extremity to the long focal length extremity, all the lens groups move toward the image.

The second lens group includes a first 2*a* sub-lens group, and a second 2*b* sub-lens group, in this order from the object.

The telephoto zoom lens system satisfies the following conditions:

$$1.6 < f_s/|f_2| < 2.1 \quad (1)$$

$$0.45 < |f_{2bn}|/f_{2bp} < 0.8 \quad (2)$$

wherein
 $f_s$: the focal length of the zoom lens system at the short focal length extremity;
 $f_2$: the focal length of the negative second lens group ($f_2 < 0$);
 $f_{2bn}$: the focal length of the biconcave negative lens element of the second 2*b* sub-lens group ($f_{2bn} < 0$); and
 $f_{2bp}$: the focal length of the biconvex positive lens element of the second 2*b* sub-lens group ($f_{2bn} > 0$).

7 Claims, 11 Drawing Sheets

SPHERICAL ABERRATION
THE SINE CONDITION

SPHERICAL ABERRATION
CHROMATIC ABERRATION

LATERAL CHROMATIC ABERRATION

ASTIGMATISM

DISTORTION

SPHERICAL ABERRATION THE SINE CONDITION

SPHERICAL ABERRATION CHROMATIC ABERRATION

LATERAL CHROMATIC ABERRATION

ASTIGMATISM

DISTORTION

Fig. 21

TELEPHOTO ZOOM LENS SYSTEM

BACKGROUND OF THE INVENTION

1. Field of the Invention

The present invention relates to a telephoto zoom lens system of a four-lens-group arrangement.

2. Description of the Prior Art

An well-known conventional telephoto zoom lens system having four lens groups is typically constituted by the following four lens groups:

a first lens group which has a positive refractive power (hereinafter, a positive first lens group), which remains stationary upon zooming, and by which focusing is performed;

a second lens group which has a negative refractive power (hereinafter, a negative second lens group), which has a zooming function, and which is arranged to be movable upon zooming;

a third lens group which has a positive refractive power (hereinafter, a positive third lens group), and which is arranged to be movable for correcting a focal-point shift; and a fourth lens group which has a positive refractive power (hereinafter, a positive fourth lens group), and which is arranged to be stationary as a master lens group for image forming.

In such a conventional telephoto zoom lens system of the four-lens-group arrangement, the overall length thereof is long, and the diameter of the most object-side lens (the positive first lens group) is large.

In Japanese Unexamined Patent Publication No. H09-133865, a zoom lens system of a five-lens-group arrangement is proposed; however, the mechanical structure thereof is complicated. Furthermore, since focusing is performed by the first lens group, such a zoom lens system is not suitable for a zoom lens system having an automatic focusing (AF) function.

In Japanese Unexamined Patent Publication No. H06-51202, an internal-focusing zoom lens system of a four-lens-group arrangement is proposed. In this four-lens-group zoom lens system, only a rear sub-lens group of the first lens group is arranged to move for focusing. Such a zoom lens system is advantageous for attaining a fixed F-number and a larger aperture, however, is disadvantageous for achieving miniaturization. Furthermore, the refractive power of the focusing lens group is small, so that the minimum photographing distance cannot be further made shorter. If an attempt is made to shorten the minimum photographing distance, the distance between the front sub-lens group and the rear sub-lens group (focusing lens group) of the first lens group has to be made longer. Consequently, the overall length of the zoom lens system becomes further longer, and the diameter of the first lens group becomes larger.

Japanese Unexamined Patent Publication No. H03-228008 proposes a zoom lens system as follows:

the zoom lens system is constituted by a positive first lens group, a negative second lens group, a positive third lens group, and a negative fourth lens group, in this order from the object;

focusing is performed by the negative second lens group; and upon zooming from the short focal length extremity to the long focal length extremity, the positive first lens group, the negative second lens group and the positive third lens group move toward the object, and the negative fourth lens group remains stationary.

However, in such a zoom lens system proposed in Japanese Unexamined Patent Publication No. H03-228008, the F-number increases upon zooming from the short focal length extremity to the long focal length extremity.

Japanese Unexamined Patent Publication No. 2003-241097 proposes a zoom lens system as follows:

the zoom lens system having a positive first lens group, a negative second lens group, a positive third lens group, and a positive fourth lens group, in this order from the object;

focusing is performed by the negative second lens group; and all the lens groups move toward the object upon zooming from the short focal length extremity to the long focal length extremity.

The above zoom lens system is advantageous for achieving miniaturization; however, the F-number at the long focal length extremity is larger.

SUMMARY OF THE INVENTION

The present invention is to provide a smaller and higher quality zoom lens system of a four-lens-group arrangement.

According to an aspect of the present invention, there is provided a telephoto zoom lens system including a positive first lens group, a negative second lens group as a focusing lens group, a diaphragm, a positive third lens group, and a positive fourth lens group, in this order from the object.

Upon zooming from the short focal length extremity to the long focal length extremity, the positive first lens group, the positive third lens group and the positive fourth lens group move toward the object, and the negative second lens group moves toward the image so that the distance between the positive first lens group and the negative second lens group increases, the distance between the negative second lens group and the positive third lens group decreases, and the distance between the positive third lens group and the positive fourth lens group decreases.

The negative second lens group includes a first $2a$ sub-lens group constituted by a biconcave negative lens element in which the image-side concave surface has a larger curvature, and a second $2b$ sub-lens group constituted by cemented lens elements having a biconcave negative lens element and a biconvex positive lens element, in this order from the object.

The telephoto zoom lens system satisfies the following conditions:

$$1.6 < f_s/|f_2| < 2.1 \quad (1)$$

$$0.45 < |f_{2bn}|/f_{2bp} < 0.8 \quad (2)$$

wherein $f_s$ designates the focal length of the entire the zoom lens system at the short focal length extremity;

$f_2$ designates the focal length of the negative second lens group ($f_2 < 0$);

$f_{2bn}$ designates the focal length of the biconcave negative lens element of the second $2b$ sub-lens group ($f_{2bn} < 0$); and $f_{2bp}$ designates the focal length of the biconvex positive lens element of the second $2b$ sub-lens group ($f_{2bn} > 0$).

The negative second lens group further includes a third $2c$ sub-lens group constituted by a positive meniscus lens element having the convex surface facing toward the object. The third $2c$ sub-lens group is preferably provided on the image side of the second $2b$ sub-lens group, and preferably satisfies the following conditions:

$$0.0 < |f_2|/f_{2c} < 0.5 \quad (3)$$

$$-0.5 < SF_{2c} < 0.0 \quad (4)$$

wherein $f_{2c}$ designates the focal length of the third 2c sub-lens group ($f_{2c}>0$);

$SF_{2c}$ designates the shaping factor of the third 2c sub-lens group ($SF_{2c}=(R_{2co}-R_{2ci})/(R_{2co}+R_{2ci})$);

$R_{2co}$ designates the radius of curvature of the most object-side surface of the third 2c sub-lens group; and $R_{2ci}$ designates the radius of curvature of the most image-side surface of the third 2c sub-lens group.

The negative second lens group further includes a third 2c sub-lens group constituted by cemented lens elements having a positive lens element and a negative lens element so that the entire cemented lens elements can be formed into the shape of a positive meniscus lens element.

The third sub-lens group preferably satisfies the following conditions:

$$0.0<|f_2|/f_{2c}<0.5 \quad (3)$$

$$-0.5<SF_{2c}<0.0 \quad (4)$$

wherein $f_{2c}$ designates the focal length of the third 2c sub-lens group ($f_{2c}>0$);

$SF_{2c}$ designates the shaping factor of the third 2c sub-lens group ($SF_{2c}=(R_{2co}-R_{2ci})/(R_{2co}+R_{2ci})$);

$R_{2co}$ designates the radius of curvature of the most object-side surface of the third 2c sub-lens group; and $R_{2ci}$ designates the radius of curvature of the most image-side surface of the third 2c sub-lens group.

The telephoto zoom lens system of the present invention preferably satisfies the following conditions:

$$0.5<X_1/f_s<1.0 \quad (5)$$

$$-0.4<X_2/f_s<0 \quad (6)$$

$$0.05<(D_{3S}-D_{3L})/f_s<0.17 \quad (7)$$

wherein $X_1$ designates the traveling distance of the positive first lens group from the short focal length extremity to the long focal length extremity upon zooming ($X_1>0$);

$X_2$ designates the traveling distance of the negative second lens group from the short focal length extremity to the long focal length extremity upon zooming ($X_2<0$);

$D_{3S}$ designates the distance between the positive third lens group and the positive fourth lens group at the short focal length extremity; and $D_{3L}$ designates the distance between the positive third lens group and the positive fourth lens group at the long focal length extremity.

The positive first lens group and the positive third lens group preferably includes at least one lens element satisfying the following conditions:

$$80<\nu_{1P} \quad (8)$$

$$80<\nu_{3P} \quad (9)$$

wherein $\nu_{1P}$ designates the Abbe number of positive lens elements in the positive first lens group; and $\nu_{3P}$ designates the Abbe number of the positive lens elements in the positive third lens group.

The telephoto zoom lens system of the present invention preferably satisfies the following condition:

$$0.09<D_{1S}/f_s<0.3 \quad (10)$$

wherein $D_{1S}$ designates the distance between the positive first lens group and the negative second lens group when an object at infinity is in an in-focus state.

The positive first lens group preferably includes a negative meniscus lens element having the convex surface facing toward the object, a biconvex positive lens element, and a positive meniscus lens element having the convex surface facing toward the object, in this order from the object.

The present disclosure relates to subject matter contained in Japanese Patent Application No. 2006-221340 (filed on Aug. 15, 2006) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 21:
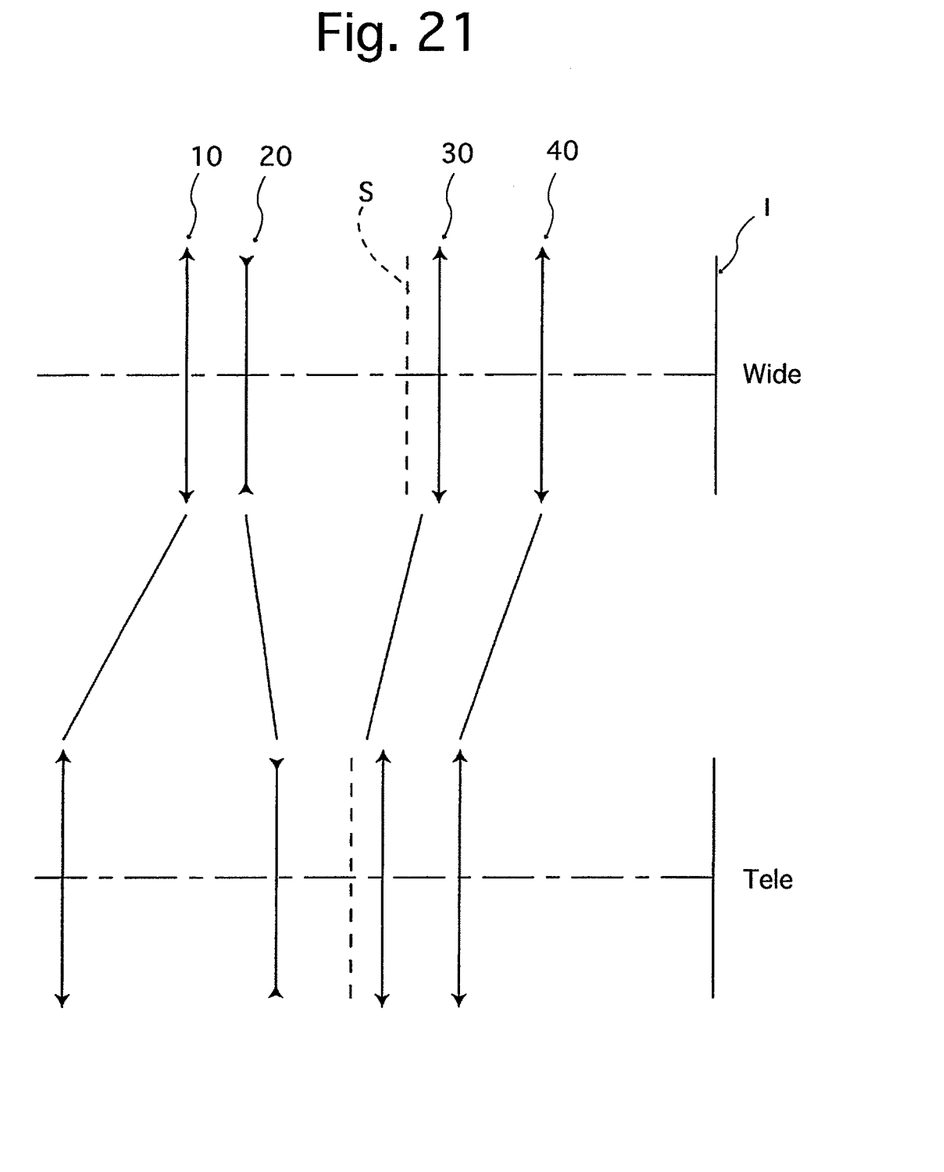
FIG. 21 is a lens-group moving paths of the telephoto zoom lens system according to the present invention.

The telephoto zoom lens system of the present invention includes, as shown in the lens-group moving paths of FIG. 21, a positive first lens group 10, a negative second lens group 20, a diaphragm S, a positive third lens group 30, and a positive fourth lens group 40, in this order from the object side.

Upon zooming from the short focal length extremity (W) to the long focal length extremity (T), the positive first lens group 10, the positive third lens group 30 and the positive fourth lens group 40 move toward the object, while the negative second lens group 20 moves toward the image so that the distance between the positive first lens group 10 and the negative second lens group 20 increases, the distances between the negative second lens group 20 and the positive third lens group 30 decreases, and the distance between the positive third lens group 30 and the positive fourth lens group 40 decrease.

A diaphragm S is arranged to move together with the positive third lens group 30.

Focusing is carried out by the negative second lens group 20.

In the telephoto zoom lens system of the illustrated embodiments, the negative second lens group 20 is movable as a focusing lens group; and the traveling distance of the positive fourth lens group is set to be shorter than that of the positive first lens group. Due to this arrangement, fluctuations of aberrations can be made smaller even at a fixed F-number In the illustrated embodiments, a feature of the above-described telephoto zoom lens system is a lens arrangement of the negative second lens group 20 which functions as both a zooming lens group and a focusing lens group.

For the purpose of comparison, in a telephoto zoom lens system of the prior art, the second lens group only functions as a focusing lens group.

Moreover, the second lens group of the prior art is constituted by a three-lens-element arrangement, i.e., a negative single lens element, a negative single lens element and a positive single lens element, in this order from the object, or, by a four-lens-element arrangement, i.e., a negative single lens element, a negative single lens element, a positive single lens element and a negative single lens element, in this order from the object.

In the prior art telephoto zoom lens system with the above lens arrangement, it is difficult to reduce fluctuations of spherical aberration of higher order and those of coma upon zooming and focusing.

On the other hand, the negative second lens group 20 includes a first 2a sub-lens group constituted by a biconcave negative lens element in which the image-side concave surface has a larger curvature (a smaller radius of curvature), and a second 2b sub-lens group constituted by cemented lens elements having a biconcave negative lens element and a biconvex positive lens element, in this order from the object.

As an alternative, the negative second lens group 20 further includes a third 2c sub-lens group constituted by a positive meniscus lens element having the convex surface facing toward the object. The third 2c sub-lens group is provided on the image side of the second 2b sub-lens group.

As an alternative of the third 2c sub-lens group, the third 2c sub-lens group is constituted by cemented lens elements having a positive lens element and a negative lens element. The entire third 2c sub-lens group is formed into the shape of a positive meniscus lens element.

Namely, the minimum number of lens elements constituting the negative second lens group 20 is three, and the maximum number of lens elements constituting the negative second lens group 20 is five. In either case, the biconcave negative lens element and the biconvex positive lens element, i.e., the second and third lens elements, counted from the object, of the negative second lens group 20, are cemented.

Conditions (1) and (2) are to be satisfied by the negative second lens group 20.

Condition (1) specifies the focal length (refractive power) of the negative second lens group 20.

If $f_s/|f_2|$ exceeds the upper limit of condition (1), the refractive power of the negative second lens group 20 becomes too strong, which is advantageous for miniaturization. However, fluctuations of spherical aberration and those of coma upon zooming and focusing become larger.

If $f_s/|f_2|$ exceeds the lower limit of condition (1), the refractive power of the negative second lens group 20 becomes weaker, which is advantageous for correcting aberrations. However, the overall length of the telephoto zoom lens system has to be made longer in order to attain a required zoom ratio.

Condition (2) concerns the second 2b sub-lens group constituted by cemented lens elements having a biconcave negative lens element and a biconvex positive lens element, in this order from the object.

The biconcave negative lens element has a strong negative refractive power; and the biconvex positive lens element have a strong positive refractive power. Therefore by cementing these lens elements, deterioration of optical performance of these lens elements with respect to manufacturing errors, e.g., lens surface shapes, a distance between lens elements, decentration, etc., can be reduced.

If the positive refractive power of the biconvex positive lens element becomes stronger to the extent that $|f_{2bn}|/f_{2bp}$ exceeds the upper limit of condition (2), spherical aberration of higher order tends to occur.

If $|f_{2bn}|/f_{2bp}$ exceeds the lower limit of condition (2), the correcting of chromatic aberration becomes difficult.

Conditions (3) and (4) are to be satisfied by the negative second lens group 20 which further includes the third 2c sub-lens group constituted by the positive meniscus lens element having the convex surface facing toward the object.

Condition (3) specifies the refractive power of the third 2c sub-lens group constituted by a positive meniscus lens element having the convex surface facing toward the object.

If the refractive power of the third 2c sub-lens group becomes stronger to the extent that $|f_2|/f_{2c}$ exceeds the upper limit of condition (3), the correcting of spherical aberration of higher order at the long focal length extremity becomes difficult.

If the refractive power of the third 2c sub-lens group becomes weaker to the extent that $|f_2|/f_{2c}$ exceeds the lower limit of condition (3), aberrations are overcorrected in the negative second lens group 20. Consequently, fluctuations of aberrations upon zooming and focusing become larger.

Condition (4) specifies the shape of the third 2c sub-lens group constituted by the positive meniscus lens element having the convex surface facing toward the object.

If $SF_{2c}$ exceeds the upper limit of condition (4), the third 2c sub-lens group becomes a negative meniscus lens element having the convex surface facing toward the object. Consequently, aberrations in the negative second lens group 20 are overcorrected.

If $SF_{2c}$ exceeds the lower limit of condition (4), the refractive power of the third 2c sub-lens group becomes stronger. Consequently, the correcting of spherical aberration of higher order becomes difficult.

The third 2c sub-lens group can be constituted by cemented lens elements having a positive lens element and a negative lens element so that the entire third 2c sub-lens group can be formed into the shape of a positive meniscus lens element. In this case, the third 2c sub-lens group satisfies conditions (3) and (4) are satisfied.

Condition (5) specifies the traveling distance of the positive first lens group 10.

If $X_1/f_s$ exceeds the upper limit of condition (5), the traveling distance of the positive third lens group 30 and that of the positive fourth lens group 40 toward the object becomes longer in order to secure peripheral illumination. Consequently, the back focal distance at the long focal length extremity becomes unnecessarily longer.

If the F-number is fixed, while $X_1/f_s$ exceeds the lower limit of condition (5), the diameter of the positive fourth lens group 40 becomes larger. Consequently, spherical aberration of higher order occurs.

Condition (6) specifies the traveling distance of the negative first lens group 20.

Generally, in a telephoto zoom lens system with a zooming range from a wide-angle extremity to a telephoto extremity, upon zooming from the short focal length extremity to the long focal length extremity, the second lens group moves toward the object. Unlike the above telephoto zoom lens system of a general type, the negative second lens group 20 of the telephoto zoom lens system according to the present invention moves toward the image.

If $X_2/f_s$ exceeds the upper limit of condition (6), the negative second lens group 20 moves toward the object, and the traveling distance of the positive third lens group 30 and that of the positive fourth lens group 40 become longer. Consequently, spherical aberration of higher order occurs.

Here, it should be noted that $X_2/f_s$ exceeding the upper limit of condition (6) means that the negative second lens group 20 moves toward the object, similar to the above telephoto zoom lens system of a general type.

If the traveling distance of the negative second lens group 20 toward the image becomes longer to the extent that $X_2/f_s$ exceeds the lower limit of condition (6), the traveling distance of the positive third lens group 30 and that of the positive fourth lens group 40 relatively become shorter. Consequently, the correcting of astigmatism becomes difficult.

Condition (7) specifies the amount of change in distance between the positive third lens group 30 and the positive fourth lens group 40.

If $(D_{3S}-D_{3L})/f_s$ exceeds the upper limit of condition (7), it is advantageous to correct astigmatism; however, the overall length of the telephoto zoom lens system becomes longer.

If $(D_{3S}-D_{3L})/f_s$ exceeds the lower limit of condition (7), fluctuations of astigmatism upon zooming become larger.

Condition (8) and condition (9) concern the correcting of chromatic aberration with respect to the positive first lens group 10 and the positive third lens group 30.

By providing a positive lens element made of a low-dispersion glass which satisfies condition (8) in the positive first lens group 10, and by providing a positive lens element made of a low-dispersion glass which satisfies condition (9) in the positive third lens group 30, chromatic aberration can be sufficiently corrected at both the short focal length extremity and the long focal length extremity.

A glass material having an Abbe number $(v_{1P}, v_{3P})$ exceeding the lower limit of conditions (8) and (9) cannot correct chromatic aberration sufficiently.

Condition (10) specifies the ratio of the distance between the positive first lens group 10 and the negative second lens group 20 when an object at infinity is in an in-focus state to the focal length of the entire the zoom lens system at the short focal length extremity. Satisfying this ratio is preferable to provide an internal focusing zoom lens system in which the second lens group 20 functions as a focusing lens group.

If $D_{1S}/f_s$ exceeds the upper limit of condition (10), further miniaturization cannot be attained.

If $D_{1S}/f_s$ exceeds the lower limit of condition (10), it becomes difficult to further shorten the minimum photographing distance.

Specific numerical data of the embodiments will be described hereinafter.

In each of the first through fifth embodiments, the zoom ratio is approximately 4, and the entrance pupil diameter (open aperture diameter) is varied in accordance with the focal length so that the f-number is fixed.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

The tables, FNO. designates the F-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number.

Embodiment 1

Figure 1:
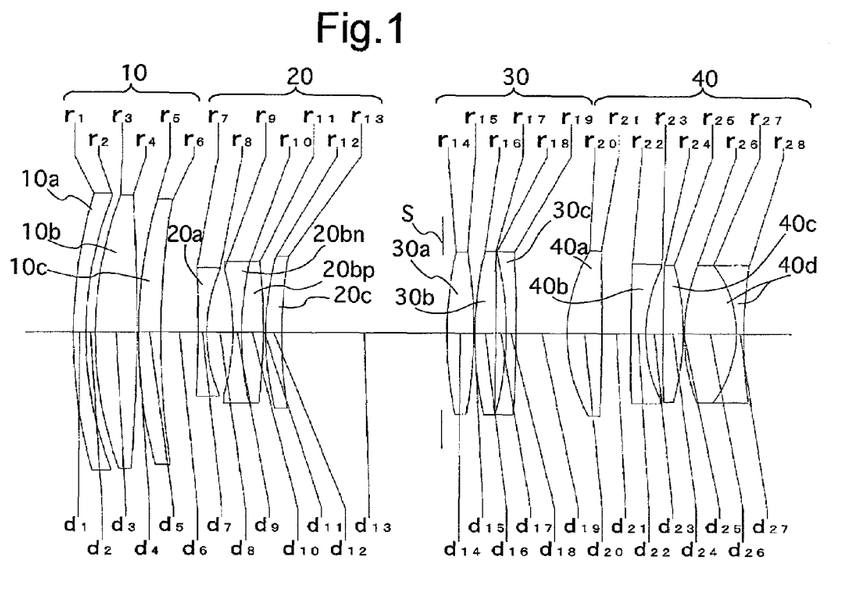
FIG. 1 is a lens arrangement of the telephoto zoom lens system according to a first embodiment of the present invention.
Figure 2A:
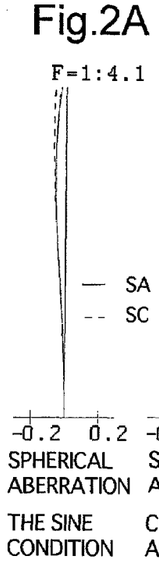
FIGS. 2A, 2B, 2c, 2D and 2E show aberrations occurred in the lens arrangement shown in FIG. 1 at the short focal length extremity.
Figures 2B, 2C:
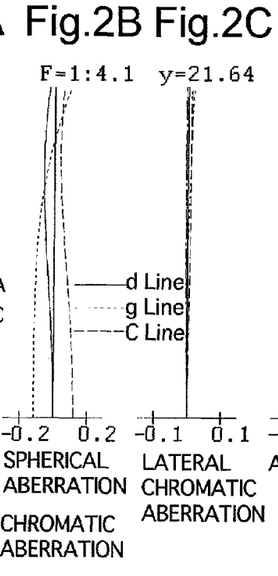
Figures 2D, 2E:
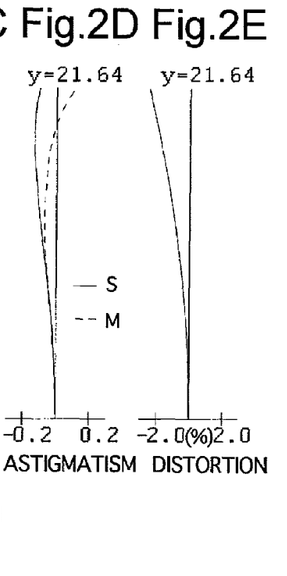
Figure 3A:
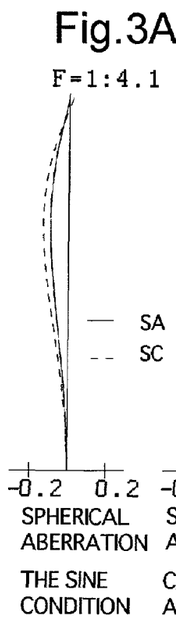
FIGS. 3A, 3B, 3C, 3D and 3E show aberrations occurred in the lens arrangement shown in FIG. 1 at an intermediate focal length.
Figure 3B:
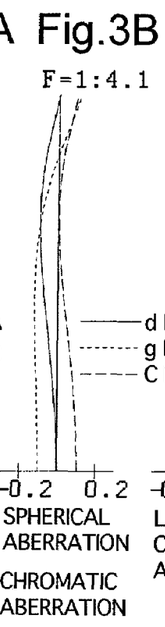
Figure 3C:
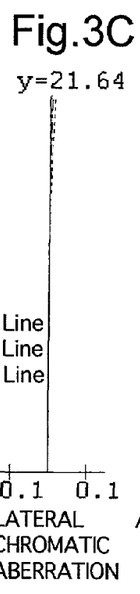
Figure 3D:
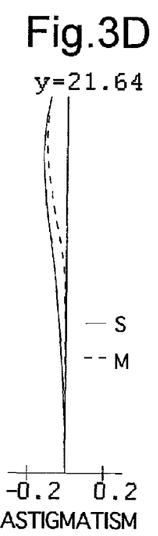
Figure 3E:
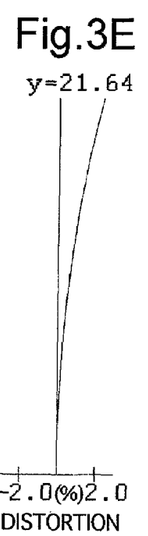
Figure 4A:
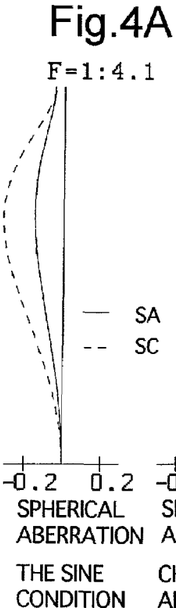
FIGS. 4A, 4B, 4C, 4D and 4E show aberrations occurred in the lens arrangement shown in FIG. 1 at the long focal length extremity.
Figure 4B:
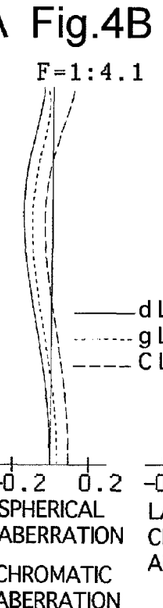
Figure 4C:
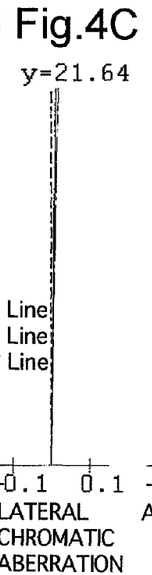
Figure 4D:
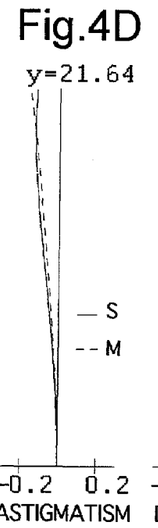
Figure 4E:
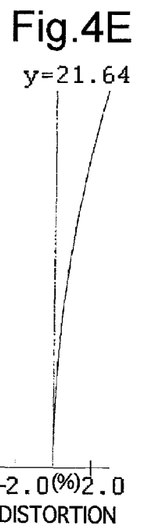

FIG. 1 is the lens arrangement of the telephoto zoom lens system according to the first embodiment of the present invention.

FIGS. 2A through 2E show aberrations occurred in the lens arrangement shown in FIG. 1 at the short focal length extremity.

FIGS. 3A through 3E show aberrations occurred in the lens arrangement shown in FIG. 1 at an intermediate focal length.

FIGS. 4A through 4E show aberrations occurred in the lens arrangement shown in FIG. 1 at the long focal length extremity.

Table 1 shows numerical date of the first embodiment when an object at infinity is in an in-focus state.

The telephoto zoom lens system of the present invention includes a positive first lens group 10, a negative second lens group 20, a diaphragm S, a positive third lens group 30, and a positive fourth lens group 40, in this order from the object.

The first lens group 10 includes three lens elements, i.e., a negative meniscus lens element 10a having the convex surface facing toward the object, a biconvex positive lens element 10b, and a positive meniscus lens element 10c having the convex surface facing toward the object, in this order from the object side.

The negative second lens group 20 is constituted by four lens elements, i.e., a biconcave negative lens element 20a (a first 2a sub-lens group) in which the image-side concave surface has a larger curvature (a smaller radius of curvature), and cemented lens elements 20b (a second 2b sub-lens group) having a biconcave negative lens element 20bn and a biconvex positive lens element 20bp, and a positive meniscus lens element 20c (a third 2c sub-lens group) having the convex surface facing toward the object, in this order from the object.

The positive third lens group 30 includes three lens elements, i.e., a biconvex positive lens element 30a, a positive lens element 30b, and a negative meniscus lens element having the convex surface facing toward the image, in this order from the object.

The positive fourth lens group 40 includes five lens elements, i.e., a biconvex positive lens element 40a in which the object-side convex surface has a larger curvature (a smaller radius of curvature), a negative lens element 40b having a concave surface facing toward the image, a positive lens element 40c, and cemented lens elements 40d having a biconvex positive lens element and a biconcave negative lens element, in this order from the object.

The diaphragm S is provided 1.00 in front of the positive third lens group 30 (surface No. 14).

TABLE 1

F = 1:4.1-4.1-4.1
f = 61.50-129.98-242.22 (Zoom Ratio = 3.94)
W = 19.8-9.2-5.0
fB = 67.50-80.69-89.21

| Surf. No. | r | d | $N_d$ | ν |
|---|---|---|---|---|
| 1 | 107.650 | 2.60 | 1.84666 | 23.8 |
| 2 | 80.388 | 1.95 | — | — |
| 3 | 83.914 | 8.80 | 1.49700 | 81.6 |
| 4 | −435.054 | 0.30 | — | — |
| 5 | 106.300 | 4.70 | 1.48749 | 70.2 |
| 6 | 180.812 | 7.79-51.82-76.30 | — | — |
| 7 | −288.152 | 1.80 | 1.77250 | 49.6 |
| 8 | 34.871 | 5.40 | — | — |
| 9 | −49.400 | 1.80 | 1.80400 | 46.6 |
| 10 | 67.227 | 4.60 | 1.84666 | 23.8 |
| 11 | −142.289 | 0.50 | — | — |
| 12 | 63.000 | 3.40 | 1.80518 | 25.4 |
| 13 | 97.810 | 34.69-19.65-3.92 | — | — |
| 14 | 82.500 | 5.60 | 1.43875 | 95.0 |
| 15 | −105.190 | 0.20 | — | — |
| 16 | 75.438 | 4.40 | 1.72916 | 54.7 |
| 17 | −1693.408 | 2.20 | — | — |
| 18 | −70.010 | 2.10 | 1.84666 | 23.8 |
| 19 | −360.000 | 10.62-4.50-2.69 | — | — |
| 20 | 35.636 | 7.30 | 1.61800 | 63.4 |
| 21 | −564.330 | 6.17 | — | — |
| 22 | 483.314 | 3.20 | 1.74320 | 49.3 |
| 23 | 31.920 | 3.70 | — | — |

TABLE 1-continued

F = 1:4.1-4.1-4.1
f = 61.50-129.98-242.22 (Zoom Ratio = 3.94)
W = 19.8-9.2-5.0
fB = 67.50-80.69-89.21

| Surf. No. | r | d | $N_d$ | ν |
|---|---|---|---|---|
| 24 | 666.343 | 4.20 | 1.60311 | 60.7 |
| 25 | −55.409 | 0.30 | — | — |
| 26 | 41.000 | 11.00 | 1.53172 | 48.9 |
| 27 | −24.213 | 1.60 | 1.77250 | 49.6 |
| 28 | 103.398 | — | — | — |

Embodiment 2

Figure 5:
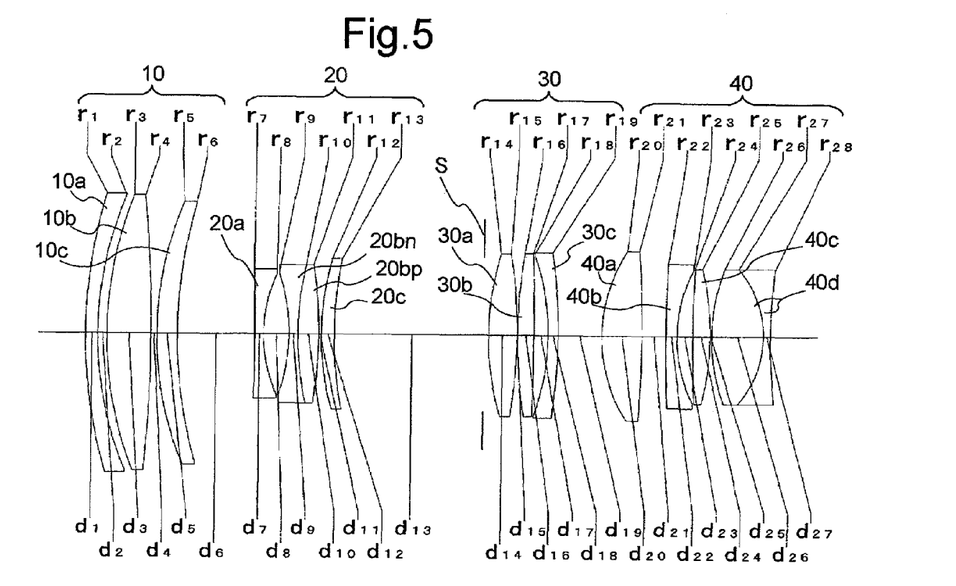
FIG. 5 is a lens arrangement of the telephoto zoom lens system according to a second embodiment of the present invention.
Figure 6A:
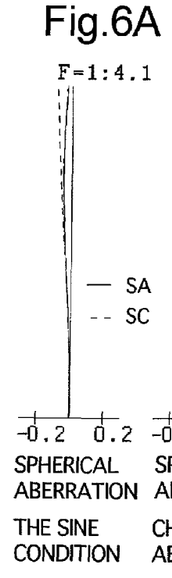
FIGS. 6A, 6B, 6C, 6D and 6E show aberrations occurred in the lens arrangement shown in FIG. 5 at the short focal length extremity.
Figures 6B, 6C:
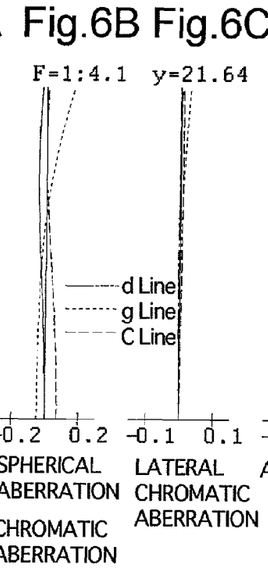
Figures 6D, 6E:
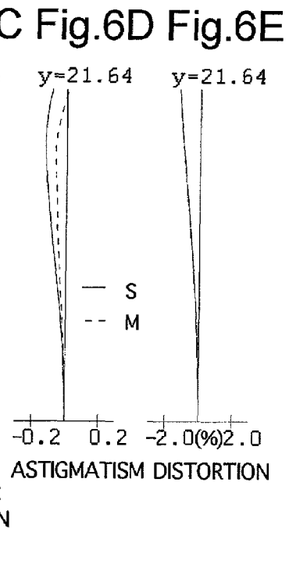
Figure 7A:
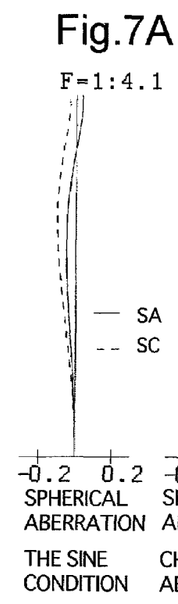
FIGS. 7A, 7B, 7C, 7D and 7E show aberrations occurred in the lens arrangement shown in FIG. 5 at an intermediate focal length.
Figures 7B, 7C, 7D:
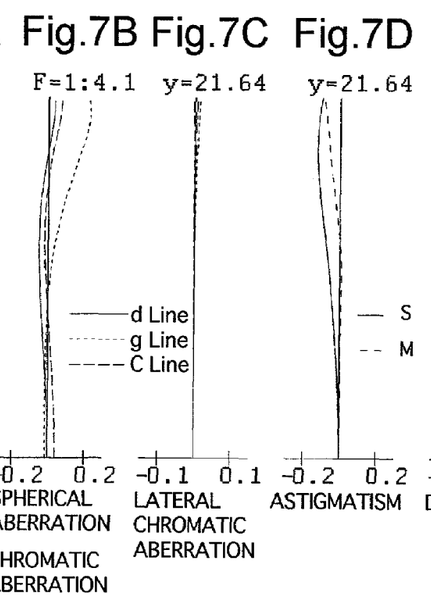
Figure 7E:
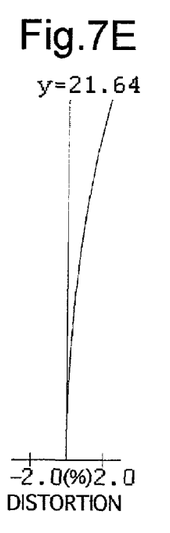
Figure 8A:
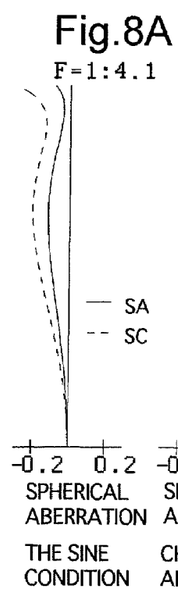
FIGS. 8A, 8B, 8C, 8D and 8E show aberrations occurred in the lens arrangement shown in FIG. 5 at the long focal length extremity.
Figures 8B, 8C, 8D:
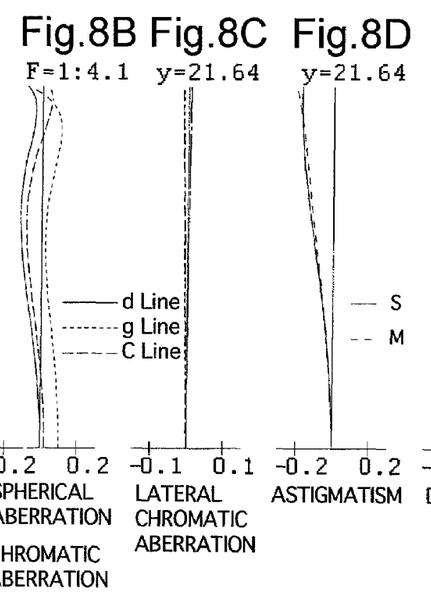
Figure 8E:
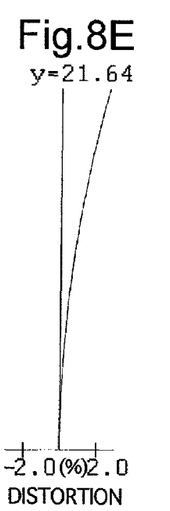

FIG. 5 is the lens arrangement of the telephoto zoom lens system according to the second embodiment of the present invention.

FIGS. 6A through 6E show aberrations occurred in the lens arrangement shown in FIG. 5 at the short focal length extremity.

FIGS. 7A through 7E show aberrations occurred in the lens arrangement shown in FIG. 5 at an intermediate focal length.

FIGS. 8A through 8E show aberrations occurred in the lens arrangement shown in FIG. 5 at the long focal length extremity.

Table 2 shows numerical date of the second embodiment when an object at infinity is in an in-focus state.

The basic lens arrangement of the telephoto zoom lens system of the second embodiment is the same as that of the first embodiment.

The diaphragm S is provided 1.00 in front of the positive third lens group 30 (surface No. 14).

TABLE 2

F = 1:4.1-4.1-4.1
f = 61.50-130.00-242.51 (Zoom Ratio = 3.94)
W = 19.6-9.2-5.0
fB = 65.54-83.23-91.92

| Surf. No. | r | d | $N_d$ | ν |
|---|---|---|---|---|
| 1 | 105.463 | 2.50 | 1.80518 | 25.4 |
| 2 | 74.830 | 1.94 | — | — |
| 3 | 79.653 | 9.24 | 1.49700 | 81.6 |
| 4 | −290.868 | 1.15 | — | — |
| 5 | 71.770 | 4.30 | 1.48749 | 70.2 |
| 6 | 97.987 | 16.23-49.80-72.38 | — | — |
| 7 | −468.378 | 1.80 | 1.77250 | 49.6 |
| 8 | 31.082 | 5.32 | — | — |
| 9 | −39.415 | 1.85 | 1.81600 | 46.6 |
| 10 | 64.085 | 4.36 | 1.84666 | 23.8 |
| 11 | −95.104 | 0.54 | — | — |
| 12 | 57.421 | 2.70 | 1.76182 | 26.5 |
| 13 | 82.361 | 32.04-17.51-4.00 | — | — |
| 14 | 59.706 | 6.00 | 1.43875 | 95.0 |
| 15 | −107.075 | 0.10 | — | — |
| 16 | 106.112 | 3.40 | 1.72916 | 54.7 |
| 17 | −621.079 | 3.00 | — | — |
| 18 | −50.795 | 2.10 | 1.84666 | 23.8 |
| 19 | −120.649 | 9.13-3.90-2.31 | — | — |
| 20 | 33.507 | 8.36 | 1.59240 | 68.3 |
| 21 | −240.009 | 4.97 | — | — |
| 22 | 324.972 | 2.30 | 1.74320 | 49.3 |
| 23 | 31.213 | 3.29 | — | — |
| 24 | 299.989 | 3.63 | 1.60311 | 60.7 |
| 25 | −60.867 | 0.30 | — | — |
| 26 | 40.858 | 10.84 | 1.54814 | 45.8 |

TABLE 2-continued

F = 1:4.1-4.1-4.1
f = 61.50-130.00-242.51 (Zoom Ratio = 3.94)
W = 19.6-9.2-5.0
fB = 65.54-83.23-91.92

| Surf. No. | r | d | $N_d$ | ν |
|---|---|---|---|---|
| 27 | −21.791 | 1.50 | 1.80400 | 46.6 |
| 28 | 123.329 | — | — | — |

Embodiment 3

Figure 9:
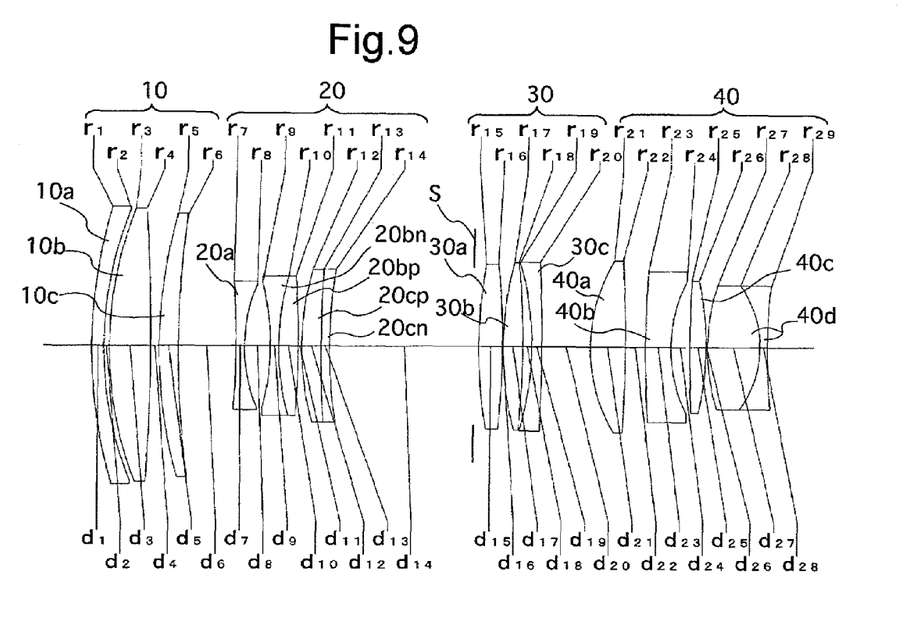
FIG. 9 is a lens arrangement of the telephoto zoom lens system according to a third embodiment of the present invention.
Figure 10A:
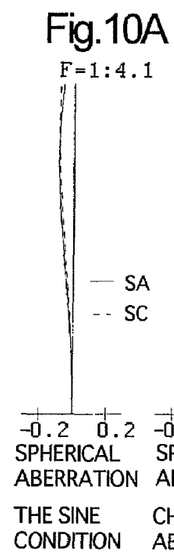
FIGS. 10A, 10B, 10C, 10D and 10E show aberrations occurred in the lens arrangement shown in FIG. 9 at the short focal length extremity.
Figures 10B, 10C:
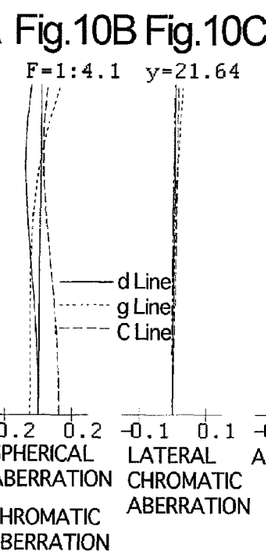
Figures 10D, 10E:
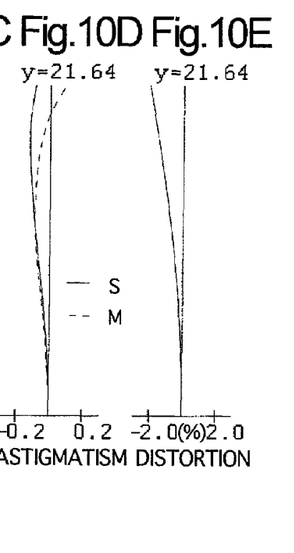
Figures 11A, 11B, 11C, 11D:
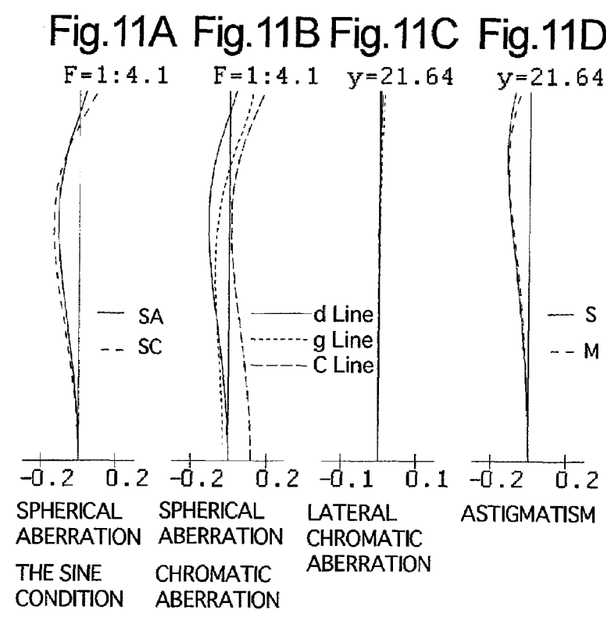
FIGS. 11A, 11B, 11C, 11D and 11E show aberrations occurred in the lens arrangement shown in FIG. 9 at an intermediate focal length.
Figure 11E:
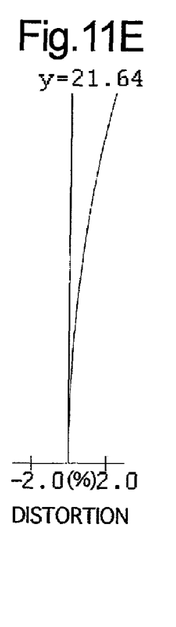
Figures 12A, 12B, 12C, 12D:
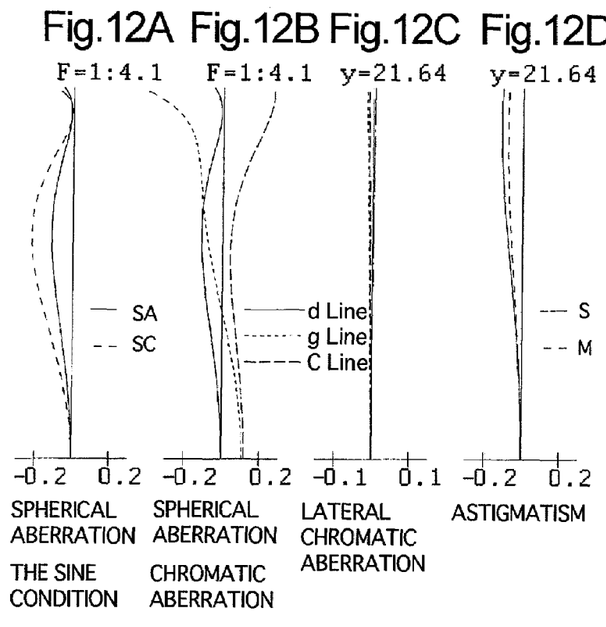
FIGS. 12A, 12B, 12c, 12D and 12E show aberrations occurred in the lens arrangement shown in FIG. 9 at the long focal length extremity.
Figure 12E:
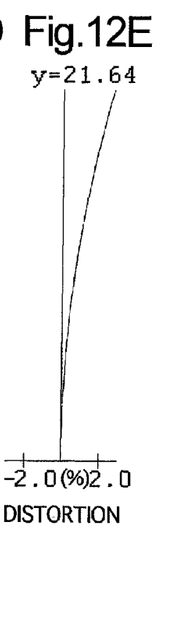

FIG. 9 is the lens arrangement of the telephoto zoom lens system according to the third embodiment of the present invention.

FIGS. 10A through 10E show aberrations occurred in the lens arrangement shown in FIG. 9 at the short focal length extremity.

FIGS. 11A through 11E show aberrations occurred in the lens arrangement shown in FIG. 9 at an intermediate focal length.

FIGS. 12A through 12E show aberrations occurred in the lens arrangement shown in FIG. 9 at the long focal length extremity.

Table 3 shows numerical date of the third embodiment when an object at infinity is in an in-focus state.

The negative second lens group 20 is constituted by five lens elements, i.e., a biconcave negative lens element 20a (a first 2a sub-lens group) in which the image-side concave surface has a larger curvature (a smaller radius of curvature), and cemented lens elements 20b (a second 2b sub-lens group) having a biconcave negative lens element 20bn and a biconvex positive lens element 20bp, and cemented lens elements 20c (a third 2c sub-lens group) having a positive meniscus lens element 20cp and a negative meniscus lens element 20cn, in this order from the object.

The remaining basic lens arrangement of the telephoto zoom lens system of the third embodiment is the same as that of the first embodiment.

The diaphragm S is provided 1.08 in front of the positive third lens group 30 (surface No. 15).

TABLE 3

F = 1:4.1-4.1-4.1
f = 61.50-130.01-242.83 (Zoom Ratio = 3.95)
W = 19.8-9.2-5.0
fB = 66.39-81.55-91.43

| Surf. No. | r | d | $N_d$ | ν |
|---|---|---|---|---|
| 1 | 106.017 | 2.50 | 1.84666 | 23.8 |
| 2 | 78.130 | 1.15 | — | — |
| 3 | 80.606 | 8.67 | 1.49700 | 81.6 |
| 4 | −428.920 | 1.83 | — | — |
| 5 | 103.090 | 4.00 | 1.48749 | 70.2 |
| 6 | 199.340 | 12.05-49.67-71.80 | — | — |
| 7 | −206.316 | 1.80 | 1.77250 | 49.6 |
| 8 | 33.981 | 5.45 | — | — |
| 9 | −52.755 | 1.70 | 1.81600 | 46.6 |
| 10 | 55.651 | 4.10 | 1.84666 | 23.8 |
| 11 | −207.572 | 0.73 | — | — |
| 12 | 60.811 | 4.00 | 1.74000 | 28.3 |
| 13 | 250.000 | 1.80 | 1.81600 | 46.6 |
| 14 | 106.956 | 31.49-17.78-4.08 | — | — |
| 15 | 100.799 | 5.00 | 1.43875 | 95.0 |
| 16 | −161.034 | 0.10 | — | — |
| 17 | 70.953 | 4.10 | 1.72916 | 54.7 |

TABLE 3-continued

F = 1:4.1-4.1-4.1
f = 61.50-130.01-242.83 (Zoom Ratio = 3.95)
W = 19.8-9.2-5.0
fB = 66.39-81.55-91.43

| Surf. No. | r | d | $N_d$ | ν |
|---|---|---|---|---|
| 18 | −174.961 | 1.90 | — | — |
| 19 | −62.650 | 2.10 | 1.84666 | 23.8 |
| 20 | −376.756 | 10.15-4.40-2.50 | — | — |
| 21 | 35.816 | 7.34 | 1.61800 | 63.4 |
| 22 | −303.628 | 4.28 | — | — |
| 23 | 238.542 | 5.37 | 1.74320 | 49.3 |
| 24 | 31.339 | 4.06 | — | — |
| 25 | 335.096 | 3.44 | 1.60311 | 60.7 |
| 26 | −63.603 | 0.30 | — | — |
| 27 | 42.818 | 11.10 | 1.54814 | 45.8 |
| 28 | −22.593 | 1.50 | 1.80400 | 46.6 |
| 29 | 113.475 | — | — | — |

Embodiment 4

Figure 13:
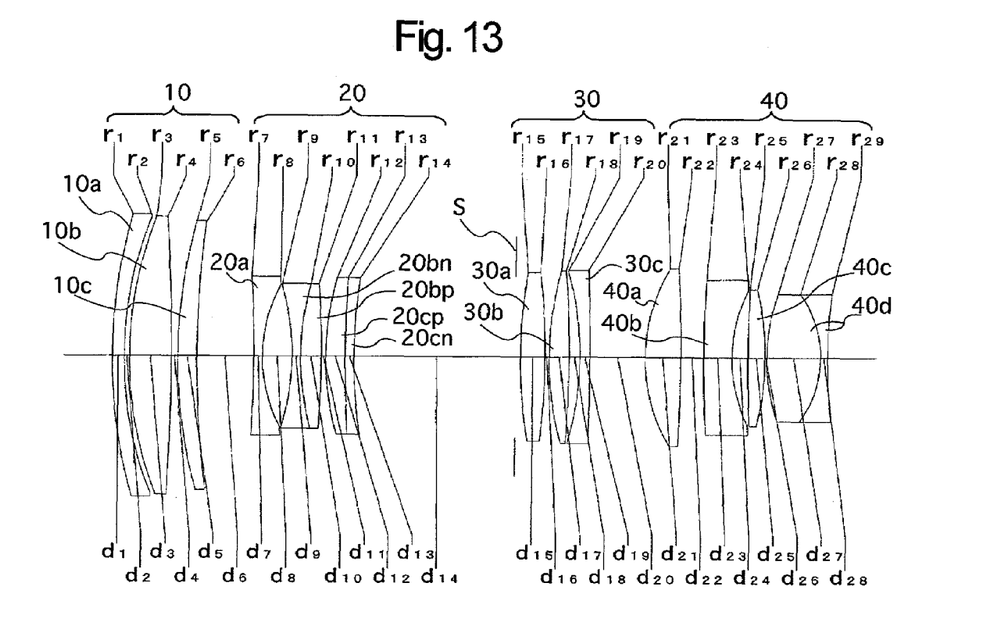
FIG. 13 is a lens arrangement of the telephoto zoom lens system according to a fourth embodiment of the present invention.
Figure 14A:
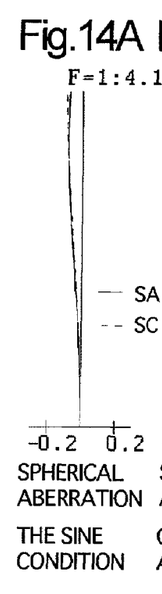
FIGS. 14A, 14B, 14C, 14D and 14E show aberrations occurred in the lens arrangement shown in FIG. 13 at the short focal length extremity.
Figures 14B, 14C, 14D, 14E:
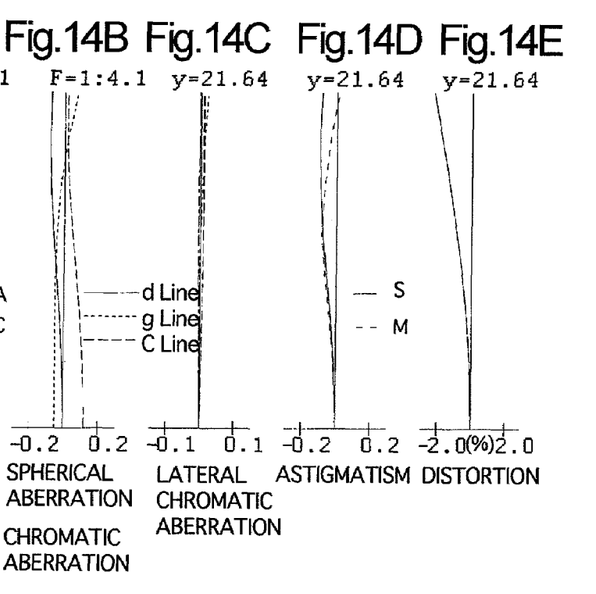
Figures 15A, 15B, 15C:
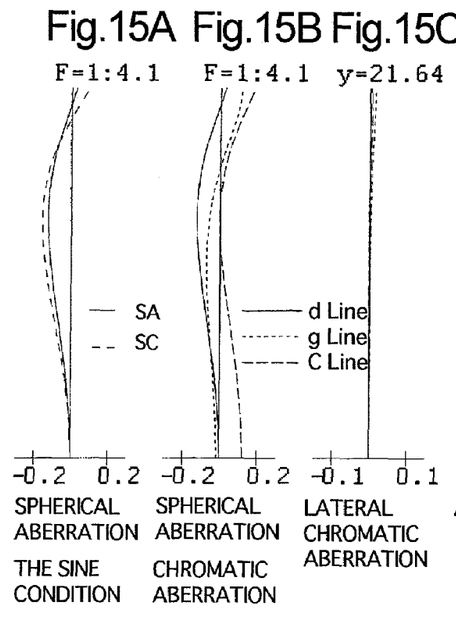
FIGS. 15A, 15B, 15C, 15D and 15E show aberrations occurred in the lens arrangement shown in FIG. 13 at an intermediate focal length.
Figure 15D:
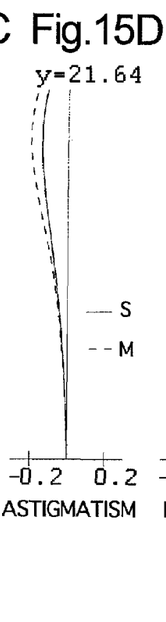
Figure 15E:
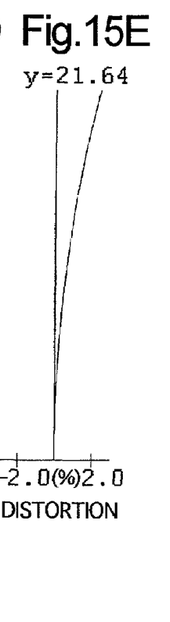
Figures 16A, 16B, 16C:
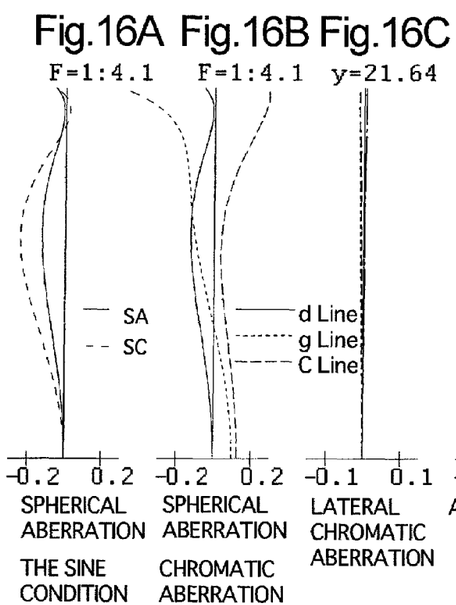
FIGS. 16A, 16B, 16C, 16D and 16E show aberrations occurred in the lens arrangement shown in FIG. 13 at the long focal length extremity.
Figure 16D:
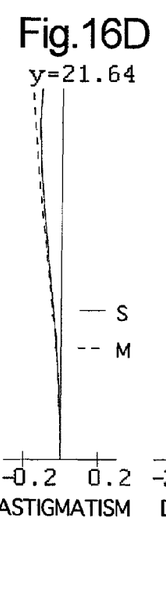
Figure 16E:
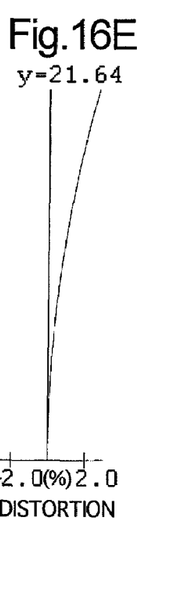

FIG. 13 is the lens arrangement of the telephoto zoom lens system according to the fourth embodiment of the present invention.

FIGS. 14A through 14E show aberrations occurred in the lens arrangement shown in FIG. 13 at the short focal length extremity.

FIGS. 15A through 15E show aberrations occurred in the lens arrangement shown in FIG. 13 at an intermediate focal length.

FIGS. 16A through 16E show aberrations occurred in the lens arrangement shown in FIG. 13 at the long focal length extremity.

Table 4 shows numerical date of the fourth embodiment when an object at infinity is in an in-focus state.

The basic lens arrangement of the telephoto zoom lens system of the fourth embodiment is the same as that of the third embodiment.

The diaphragm S is provided 1.07 in front of the positive third lens group 30 (surface No. 15).

TABLE 4

F = 1:4.1-4.1-4.1
f = 56.06-129.59-242.95 (Zoom Ratio = 4.33)
W = 21.5-9.3-5.0
fB = 63.22-83.54-92.80

| Surf. No. | r | d | $N_d$ | ν |
|---|---|---|---|---|
| 1 | 105.459 | 2.50 | 1.84666 | 23.8 |
| 2 | 77.795 | 1.14 | — | — |
| 3 | 80.096 | 8.62 | 1.49700 | 81.6 |
| 4 | −473.184 | 1.32 | — | — |
| 5 | 104.323 | 4.00 | 1.48749 | 70.2 |
| 6 | 213.696 | 11.75-49.39-71.99 | — | — |
| 7 | −287.545 | 1.80 | 1.77250 | 49.6 |
| 8 | 32.225 | 6.04 | — | — |
| 9 | −52.060 | 1.70 | 1.81600 | 46.6 |
| 10 | 56.680 | 4.23 | 1.84666 | 23.8 |
| 11 | −205.225 | 0.88 | — | — |
| 12 | 59.790 | 4.00 | 1.74000 | 28.3 |
| 13 | 250.000 | 1.80 | 1.81600 | 46.6 |
| 14 | 106.312 | 34.50-17.76-4.07 | — | — |
| 15 | 105.461 | 5.00 | 1.43875 | 95.0 |
| 16 | −160.044 | 0.86 | — | — |
| 17 | 68.760 | 4.10 | 1.72916 | 54.7 |
| 18 | −224.336 | 2.22 | — | — |
| 19 | −65.114 | 2.10 | 1.84666 | 23.8 |
| 20 | −517.391 | 11.42-4.09-2.29 | — | — |

TABLE 4-continued

F = 1:4.1-4.1-4.1
f = 56.06-129.59-242.95 (Zoom Ratio = 4.33)
W = 21.5-9.3-5.0
fB = 63.22-83.54-92.80

| Surf. No. | r | d | $N_d$ | ν |
|---|---|---|---|---|
| 21 | 36.087 | 7.43 | 1.61800 | 63.4 |
| 22 | −326.270 | 4.77 | — | — |
| 23 | 273.959 | 5.81 | 1.74320 | 49.3 |
| 24 | 31.902 | 3.31 | — | — |
| 25 | 314.303 | 3.59 | 1.60311 | 60.7 |
| 26 | −60.683 | 0.30 | — | — |
| 27 | 40.656 | 11.10 | 1.54814 | 45.8 |
| 28 | −22.712 | 1.51 | 1.80400 | 46.6 |
| 29 | 107.946 | — | — | — |

Embodiment 5

Figure 17:
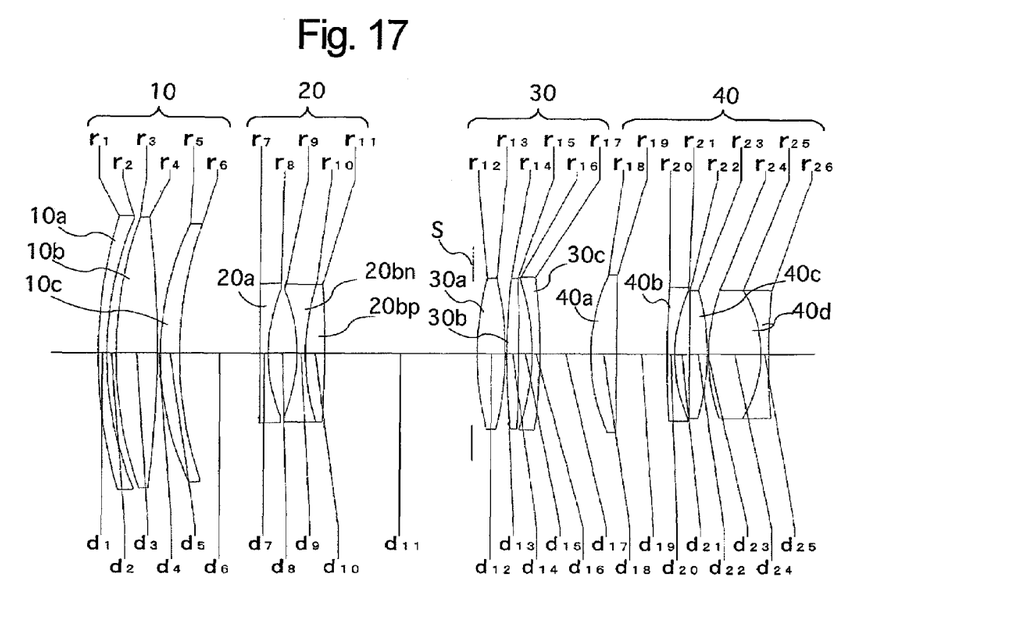
FIG. 17 is a lens arrangement of the telephoto zoom lens system according to a fifth embodiment of the present invention.
Figure 18A:
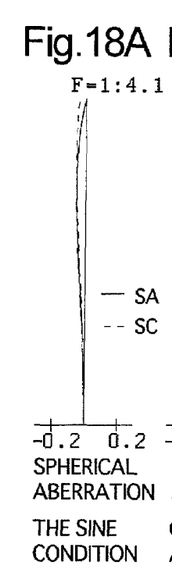
FIGS. 18A, 18B, 18C, 18D and 18E show aberrations occurred in the lens arrangement shown in FIG. 17 at the short focal length extremity.
Figures 18B, 18C:
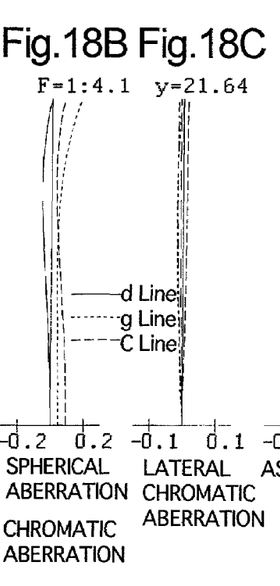
Figures 18D, 18E:
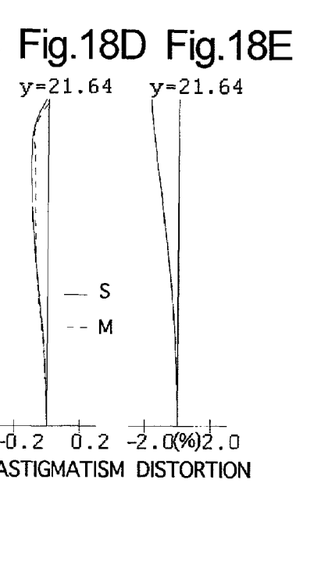
Figures 19A, 19B, 19C, 19D, 19E:
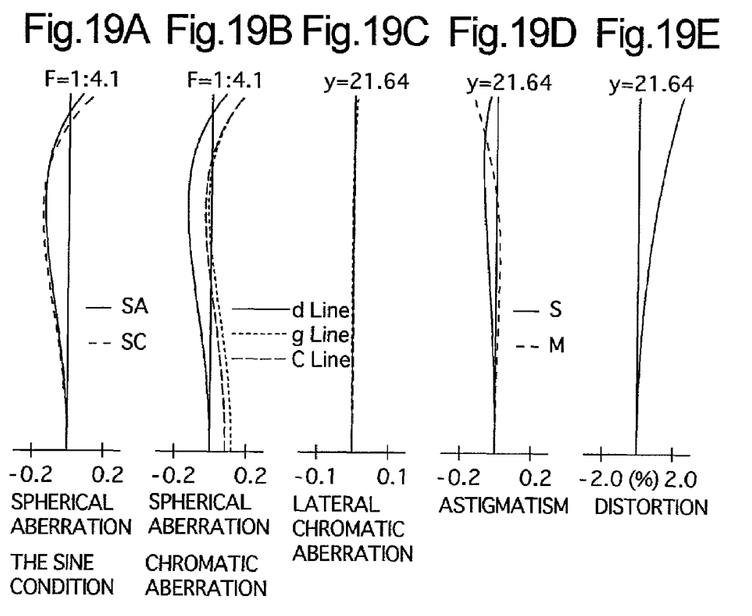
FIGS. 19A, 19B, 19C, 19D and 19E show aberrations occurred in the lens arrangement shown in FIG. 17 at an intermediate focal length.
Figure 20A:
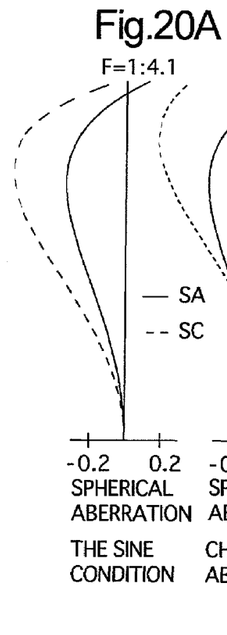
FIGS. 20A, 20B, 20C, 20D and 20E show aberrations occurred in the lens arrangement shown in FIG. 17 at the long focal length extremity.
Figures 20B, 20C, 20D, 20E:
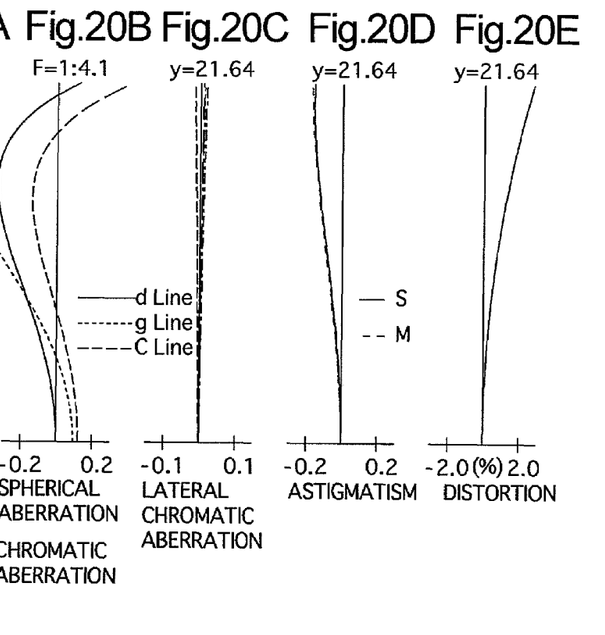

FIG. 17 is the lens arrangement of the telephoto zoom lens system according to the fifth embodiment of the present invention.

FIGS. 18A through 18E show aberrations occurred in the lens arrangement shown in FIG. 17 at the short focal length extremity.

FIGS. 19A through 19E show aberrations occurred in the lens arrangement shown in FIG. 17 at an intermediate focal length.

FIGS. 20A through 20E show aberrations occurred in the lens arrangement shown in FIG. 17 at the long focal length extremity.

Table 5 shows numerical date of the fifth embodiment when an object at infinity is in an in-focus state.

The negative second lens group 20 is constituted by three lens elements, i.e., a biconcave negative lens element 20a (a first 2a sub-lens group) in which the image-side concave surface has a larger curvature (a smaller radius of curvature), and cemented lens elements 20b (a second 2b sub-lens group) having a biconcave negative lens element 20bn and a biconvex positive lens element 20bp, in this order from the object.

The remaining basic lens arrangement of the telephoto zoom lens system of the fifth embodiment is the same as that of the first embodiment.

The diaphragm S is provided 1.00 in front of the positive third lens group 30 (surface No. 12).

TABLE 5

F = 1:4.1-4.1-4.1
f = 61.50-130.00-242.49 (Zoom Ratio = 3.94)
W = 19.7-9.2-5.0
fB = 65.97-83.89-93.40

| Surf. No. | r | d | $N_d$ | ν |
|---|---|---|---|---|
| 1 | 103.381 | 1.80 | 1.80518 | 25.4 |
| 2 | 75.878 | 2.00 | — | — |
| 3 | 87.014 | 8.80 | 1.49700 | 81.6 |
| 4 | −239.344 | 0.72 | — | — |
| 5 | 65.866 | 4.00 | 1.48749 | 70.2 |
| 6 | 84.802 | 16.94-49.53-71.40 | — | — |
| 7 | −5332.620 | 1.80 | 1.77250 | 49.6 |
| 8 | 36.109 | 6.10 | — | — |
| 9 | −35.745 | 1.80 | 1.63854 | 55.4 |
| 10 | 49.217 | 4.10 | 1.84666 | 23.8 |
| 11 | −234.004 | 32.43-17.10-3.00 | — | — |
| 12 | 63.635 | 6.00 | 1.43875 | 95.0 |
| 13 | −69.938 | 0.30 | — | — |
| 14 | 151.160 | 2.60 | 1.69680 | 55.5 |

TABLE 5-continued

F = 1:4.1-4.1-4.1
f = 61.50-130.00-242.49 (Zoom Ratio = 3.94)
W = 19.7-9.2-5.0
fB = 65.97-83.89-93.40

| Surf. No. | r | d | $N_d$ | ν |
|---|---|---|---|---|
| 15 | −545.783 | 2.85 | — | — |
| 16 | −49.759 | 1.70 | 1.84666 | 23.8 |
| 17 | −122.508 | 10.91-4.94-2.77 | — | — |
| 18 | 40.243 | 5.50 | 1.62299 | 58.2 |
| 19 | 2719.651 | 10.80 | — | — |
| 20 | 235.429 | 1.60 | 1.60562 | 43.7 |
| 21 | 34.360 | 3.08 | — | — |
| 22 | 1245.201 | 3.80 | 1.51633 | 64.1 |
| 23 | −50.841 | 0.30 | — | — |
| 24 | 41.931 | 11.00 | 1.54814 | 45.8 |
| 25 | −27.071 | 1.60 | 1.80400 | 46.6 |
| 26 | 159.811 | — | — | — |

The numerical values of each condition for each embodiment are shown in Table 6.

TABLE 6

| | Embod. 1 | Embod. 2 | Embod. 3 | Embod. 4 | Embod. 5 |
|---|---|---|---|---|---|
| Cond. (1) | 1.805 | 2.023 | 2.005 | 1.836 | 1.982 |
| Cond. (2) | 0.646 | 0.648 | 0.631 | 0.625 | 0.665 |
| Cond. (3) | 0.162 | 0.128 | 0.158 | 0.162 | — |
| Cond. (4) | −0.216 | −0.178 | −0.275 | −0.280 | — |
| Cond. (5) | 0.838 | 0.775 | 0.809 | 0.897 | 0.721 |
| Cond. (6) | −0.276 | −0.138 | −0.163 | −0.178 | −0.165 |
| Cond. (7) | 0.129 | 0.111 | 0.124 | 0.163 | 0.132 |
| Cond. (8) | 81.6 | 81.6 | 81.6 | 81.6 | 81.6 |
| Cond. (9) | 95.0 | 95.0 | 95.0 | 95.0 | 95.0 |
| Cond. (10) | 0.127 | 0.264 | 0.196 | 0.210 | 0.275 |

As can be understood from Table 6, the first through fifth embodiments satisfy conditions (1) through (10). Furthermore, as can be understood from the aberration diagrams, the various aberrations are adequately corrected.

According to the above descriptions, a telephoto zoom lens system of the four-lens-group arrangement, i.e., the positive first lens group, the negative second lens group, the positive third lens group and the positive fifth lens group, in this order from the object, in which zooming is performed by moving all the lens groups, and focusing is performed by the negative second lens group, can be miniaturized and maintain higher optical performance.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A telephoto zoom lens system comprises a positive first lens group, a negative second lens group as a focusing lens group, a diaphragm, a positive third lens group, and a positive fourth lens group, in this order from an object, wherein upon zooming from the short focal length extremity to the long focal length extremity, said positive first lens group, said positive third lens group and said positive fourth lens group move toward the object, and said negative second lens group moves toward the image so that the distance between said positive first lens group and said negative second lens group increases, the distance between said negative second lens group and said positive third lens group decreases, and the distance between said positive third lens group and said positive fourth lens group decreases;
wherein said negative second lens group comprises a first 2a sub-lens group comprising a biconcave negative lens element in which the image-side concave surface has a larger curvature, and a second 2b sub-lens group comprising cemented lens elements having a biconcave negative lens element and a biconvex positive lens element, in this order from the object;
wherein said telephoto zoom lens system satisfies the following conditions:

$1.6 < f_s/|f_2| < 2.1$ $0.45 < |f_{2bn}|/f_{2bp} < 0.8$ wherein
$f_s$ designates the focal length of the entire the zoom lens system at the short focal length extremity;
$f_2$ designates the focal length of said negative second lens group ($f_2 < 0$);
$f_{2bn}$ designates the focal length of said biconcave negative lens element of said second sub-lens group ($f_{2bn} < 0$); and
$f_{2bp}$ designates the focal length of said biconvex positive lens element of said second sub-lens group ($f_{2bn} > 0$).

2. The telephoto zoom lens system according to claim 1, wherein said negative second lens group further comprises a third 2c sub-lens group comprising a positive meniscus lens element having the convex surface facing toward the object,
wherein said third 2c sub-lens group is provided on the image side of said second 2b sub-lens group, and satisfies the following conditions:

$0.0 < |f_2|/f_{2c} < 0.5$ $-0.5 < SF_{2c} < 0.0$ wherein
$f_2$ designates the focal length of said negative second lens group ($f_2 < 0$);
$f_{2c}$ designates the focal length of said third 2c sub-lens group ($f_{2c} > 0$);
$SF_{2c}$ designates the shaping factor of said third 2c sub-lens group ($SF_{2c} = (R_{2co} - R_{2ci})/(R_{2co} + R_{2ci})$);
$R_{2co}$ designates the radius of curvature of the most object-side surface of said third 2c sub-lens group; and
$R_{2ci}$ designates the radius of curvature of the most image-side surface of said third 2c sub-lens group.

3. The telephoto zoom lens system according to claim 1, wherein said negative second lens group further comprises a third 2c sub-lens group comprising cemented lens elements having a positive lens element and a negative lens element so that said entire cemented lens elements are formed into the shape of a positive meniscus lens element; and
wherein said third 2c sub-lens group satisfies the following conditions:

$0.0 < |f_2|/f_{2c} < 0.5$ $-0.5 < SF_{2c} < 0.0$ wherein
$f_2$ designates the focal length of said negative second lens group ($f_2 < 0$);

$f_{2c}$ designates the focal length of said third 2c sub-lens group ($f_{2c} > 0$);
$SF_{2c}$ designates the shaping factor of said third 2c sub-lens group ($SF_{2c} = (R_{2co} - R_{2ci})/(R_{2co} + R_{2ci})$);
$R_{2co}$ designates the radius of curvature of the most object-side surface of said third 2c sub-lens group; and
$R_{2ci}$ designates the radius of curvature of the most image-side surface of said third 2c sub-lens group.

4. The telephoto zoom lens system according to claim 1, further satisfying the following conditions:

$0.5 < X_1/f_s < 1.0$ $-0.4 < X_2/f_s < 0$ $0.05 < (D_{3S} - D_{3L})/f_s < 0.17$ wherein
$X_1$ designates the traveling distance of said positive first lens group from the short focal length extremity to the long focal length extremity upon zooming ($X_1 > 0$);
$X_2$ designates the traveling distance of said negative second lens group from the short focal length extremity to the long focal length extremity upon zooming ($X_2 < 0$);
$D_{3S}$ designates the distance between said positive third lens group and said positive fourth lens group at the short focal length extremity; and
$D_{3L}$ designates the distance between said positive third lens group and said positive fourth lens group at the long focal length extremity.

5. The telephoto zoom lens system according to claim 1, wherein said positive first lens group and said positive third lens group comprises at least one lens element satisfying the following conditions:

$80 < \nu_{1P}$ $80 < \nu_{3P}$ wherein
$\nu_{1P}$ designates the Abbe number of positive lens elements in said positive first lens group; and
$\nu_{3P}$ designates the Abbe number of positive lens elements in said positive third lens group.

6. The telephoto zoom lens system according to claim 1, further satisfying the following condition:

$0.09 < D_{1S}/f_s < 0.3$ wherein
$D_{1S}$ designates the distance between said positive first lens group and said negative second lens group when an object at infinity is in an in-focus state; and
$f_s$ designates the focal length of the entire the zoom lens system at the short focal length extremity.

7. The telephoto zoom lens system according to claim 1, wherein said positive first lens group comprises a negative meniscus lens element having the convex surface facing toward the object, a biconvex positive lens element, and a positive meniscus lens element having the convex surface facing toward the object, in this order from the object.

* * * * *